United States Patent [19]

Bergeron

[11] Patent Number: 4,764,666

[45] Date of Patent: Aug. 16, 1988

[54] ON-LINE WAGERING SYSTEM WITH PROGRAMMABLE GAME ENTRY CARDS

[75] Inventor: Daniel R. Bergeron, Pawtucket, R.I.

[73] Assignee: GTECH Corporation, Providence, R.I.

[21] Appl. No.: 98,544

[22] Filed: Sep. 18, 1987

[51] Int. Cl.$^4$ .............................................. G06K 5/00
[52] U.S. Cl. ..................................... 235/380; 235/375
[58] Field of Search ................................ 235/375, 380

[56] References Cited

U.S. PATENT DOCUMENTS

4,304,990  12/1981  Atalla ................................... 235/380

Primary Examiner—Harold I. Pitts
Attorney, Agent, or Firm—Steele, Gould & Fried

[57] ABSTRACT

An on-line wagering system with programmable game entry cards including cards having on-card data storage for value tokens and data uniquely related to the player. The player cards are operable as payment means in which the tokens are spent and as play validation and play entry means in lieu of mark sense slips and printed validation receipts. Demographic player data uniquely related to the owner of the card is stored on the card and possibly in the central wagering system memory. This allows correlation of play entries with player demographics. A plurality of agent terminals in data communication with the central data processor interface between the central processor and the player cards. The agent terminals preferably also accept traditional mark sense entry slips and produce printed verification receipts, upon request.

21 Claims, 3 Drawing Sheets

ON-LINE WAGERING SYSTEM WITH PROGRAMMABLE GAME ENTRY CARDS

BACKGROUND OF THE INVENTION

1. Field of the Invention

This invention relates to the field of on-line wagering systems of the type in which a number of agent terminals in data communication with a central data processor manage the acceptance and validation of play entries in games of change or skill. The players, for example, guess the outcome of unpredictable events, and the correct or most nearly correct entrants share a prize. In particular, the invention relates to an improved on-line wagering system of this type, wherein player entries (past and present), payment, play validation and storage of information regarding the identities and demographics of individual players are managed by means of memory cards issued to the individual players, the memory cards being interfaced with the agent terminals when a player enters a game.

2. Prior Art

User-carried information storage cards are known in connection with identification functions and as means to manage debiting and crediting of customers' financial accounts. Cards range from passive memory storage means in which a magnetic strip affixed to a thin plastic card stores digital data such as the player's account number and current balance, to more sophisticated devices in which an integrated circuit and memory are embedded in a card, the card being substantially the same dimensions as a familiar plastic credit card. Such cards are convenient when dealing with payment of money. The customer's current account balance is recorded on the card and a corrected balance is written after reading and debiting the the current balance to account for purchases and the like. The card functions as a portable means for storing indicia representing value.

User carried cards also are known for identification purposes. The cards each carry a unique customer code such as an identity code or account number, that can be easily read by electronic equipment such as a security gate apparatus, credit card reader or an automatic bank teller machine. Frequently, the user must manually enter a second code that is matched to the account number, etc. A central data processor at the bank, credit company or the like handles storage of variable information such as the remaining credit or current account value. This type of card is a read-only device that allows the carrier access to the premises or account.

User-carried cards for identification purposes are shown, for example, in U.S. Pat. Nos. 4,575,621—Dreifus; 4,459,075—Saada et al; 4,491,725—Pritchard; 4,501,960—Jouvet et al; 4,373,134—Grace et al; and, 4,544,834—Newport et al. These patents, in varying levels of sophistication, disclose details by which information can be stored on a card and used for identification purposes including handling sales of products or services without the need for cash or other forms of electronic information transfer.

Some general purpose means including cards adapted to store information are disclosed in U.S. Pat. Nos. 4,511,796—Aigo; 4,532,419—Takeda, and 4,004,133—Hannan et al. U.S. Pat. No. 4,352,011—Guillou discloses a card specifically adapted for subscribing to a video script processing system. Cards of this type, which include on-card processors and/or extensive control electronics, are described herein as "smart cards."

The disclosures of the foregoing patents relating to structural and functional attributes of user-carried memory devices are incorporated herein. One can also refer to currently available smart card products, for example, those of Thomson Components-Mostek Corporation, 1310 Electronics Drive, Carrollton, TX 75006. Notwithstanding this variety of uses for financial and identification cards, systems and devices to data have not adapted smart card technology to the peculiar needs of on-line wagering systems. Wagering systems known to data have not been adapted to take advantage of the capabilities, over and above simple account-storing or user-identifying cards, that become possible in an on-line wagering system having smart card means for alternative inputs and outputs to the agent terminals, in addition to or instead of inputs and outputs used traditionally.

A typical prior art on-line wagering system includes a plurality of agent terminals dispersed throughout a geographical area, each one in at least occasional data communication with a central system data processor, for example, by radio or telephone lines, or by downloading a stored record of transactions. Communications can be encrypted for transmission of critical data such as win indicia in an "instant" game in which the agent terminal is adapted to immediately issue a validated play card, for example with a scratch-off surface removed by the user to reveal card win indicia. In many games the player guesses the occurrence of random or at least unpredictable events, such as the drawing of numbers, the outcome of sporting events and the like. Before approaching the agent terminal the user according to the prior art makes hand written entries on an entry card having printed boxes or similar areas to be marked for selecting among different numbers, contestants or other indicia which may become the winning entry. A user may be required, for example, to choose and mark six correct numbers from forty possible numbers for each individual entry. This marked entry card is read at the agent terminal, for example using optical mark sensing equipment, and the agent terminal transmits the data to the central lottery computer, which validates the data and returns a validation code to the agent terminal. The agent terminal then prints a validation receipt as proof of an entry, which is carried by the user and eventually compared to winning numbers published or otherwise disseminated when a winner is picked. Alternatively, keyboard entry means at the agent terminals can be used to select play entry data, or to select generation of random numbers if the user so chooses.

Many users repeat their entry numbers or other patterns of playing data every time they play. These patterns might be, for example, particular numbers such as birthdays, social security numbers, license tag numbers or other arbitrarily-chosen numbers or patterns which a user regards as lucky. Users who repeat their patterns must complete a mark sense entry for every play or explain to the operator of the agent terminal the particular data and/or data pattern desired. In many on-line wagering systems, particularly in Europe, every play entry of every wagering game must be accompanied by the user's name and address, as a means to facilitate payment of winnings and to provide marketing data to management. The user must enter this data for each entry card. For repeat pattern players, it is quite tedious to complete their entry forms, which is a disincentive to play. Some agents even keep card files near their terminals for reference when entering play data, as a service for their regular repeat pattern players.

On-line wagering system managers in most cases have very little information about the players. Mark-sensed entry cards in those systems where entries must include users' names and addresses could be collected and analyzed to determine playing patterns and demographics from the addresses given by entrants, and possibly to determine their likely gender based upon their first names. However, complete data necessary to analyze demographic particulars of players is practically not available according to a typical on-line wagering system. Similarly, the individual playing history of a given player is not available or even possible to generate, except in name/address entry systems, and even then only with the greatest difficulty. Therefore, it is not possible to determine statistically the attributes of persons playing the lottery, their identities and playing habits, or otherwise to generate data that would assist operators of on-line wagering systems in marketing their products to specific players or to specific demographic groups.

A typical smart card as used according to the prior art for access to an account such as a bank account stores only a few digital data words. The card is not primarily useful for storage of any substantial amount of information. Instead, the card stores one or more unique codes (e.g., account numbers and/or security codes), which are associated by the data processing equipment at the bank with internal memory records (e.g., the stored account balance). On the other hand, in connection with a card in which indicia representing increments of value are stored on the card and are decremented when using the card to purchase a product or service, there has been no need to store any data relative to the user. In the latter case, storage of the incremental value indicia or "tokens" has been sufficient.

According to the present invention, a smart card arrangement for a typical on-line wagering system substantially improves system convenience for users, and also permits the management to monitor performance and playing history relative to individual players and/or groups.

Smart cards available from Thomson Components-Mostek Corporation are available with on-board security means operative to disable the card in the event unauthorized attempts are made to alter the contents thereof. According to the present invention, security capabilities of smart cards are employed in order to prevent a user from increasing the number of token values stored on the card, which under control of a terminal are incremented upon receipt of payment from the customer, and decremented upon the customer purchasing an on-line wagering service, specifically buying a play entry. On-card data storage means, i.e., circuitry resident on the card, preferably accepts validation codes returned from the central processing computer of the wagering system, obviating the need for a printed validation ticket, otherwise required for the user to prove a play entry. Unscrupulous persons may have an incentive to attempt to increase playing tokens or to discover a winning validation code and attempt to claim a prize. However, the smart card according to the system of the invention is uniquely associated with an individual person. It is not possible for one person to claim a prize on a play which readily can be determined by reference to available wagering system data to belong to another person.

According to the invention, the security of an on-line wagering system can be further increased by storing an ecryption code directly on an individual user's smart card. This encryption code can be an encryption key that is uniquely stored on the user's smart card, and not available through the central data processor except during actual communications with the agent terminal in which the smart card has been loaded. An encryption key code, matched to an encryption key code at the central processor, can be arranged according to algorithms known in the prior art to encrypt data stored on a smart card such that unscrupulous persons who attempt to discern data on the card or data transmitted between the on-line wagering system and the card, would need both the key on the card and the key in the on-line wagering system central processor. This arrangement substantially improves security and can be combined with an on-card security means adapted to disable a card in the event of detected unauthorized access.

It is possible to arrange a smart card to include non-refillable token value storage, for example in the form of fusible bits that are electrically broken when the user "spends" a token. U.S. Pat. No. 4,443,027—McNeely et al teaches fusible means used to activate a single credit card for access to any of a number of credit accounts for which the user may qualify. According to the present invention, fusible or electrically programmable bits can be arranged to store the value tokens and access to the tokens can be guarded by means adapted to detect unauthorized access (e.g. access attempted without the correct encryption code) and to disable the card in the event unauthorized access is detected.

Limited access to data on the card by its authorized user is a valuable feature and can be facilitated, with respect to at least part of the information stored on the card. U.S. Pat. No. 4,523,297—Ugon et al discloses a memory storage card which is insertable into a casing slot similar to a calculator housing, having a keyboard input and display means. It has also been attempted to mount keyboard means directly on a card, and to arrange a thin LCD display on the card as a means to read out data stored on a smart card. U.S. Pat. Nos. 3,982,102—Cidade and 4,268,744—McGeary disclose means for a user to store information on a card. Cidade discloses means for manually punching holes in a punch card, for selecting play entry data in a lottery. McGeary discloses magnetic memory means that can be written upon to store a user's golf scores. These references disclose means for user-controlled storage, but lack the interactive features of a smart card that make the smart card particularly useful as a user-carried entry means for on-line wagering.

According to the present invention, an on-line wagering system can be operated with increased security and decreased expense, without the need for printed verification receipts, mark sense betting slips or other paper indicia. Security is enhanced while accuracy and convenience are increased, with the additional benefit that marketing information becomes available to operators of the wagering system in a convenient manner that is easily integrated with wagering system operations.

SUMMARY OF THE INVENTION

It is an object of the invention to employ the benefits of user cards with on-card data memory in an on-line wagering system characterized by a plurality of agent terminals communicating play entries with a central processor.

It is also an object of the invention to improve the accuracy, security and convenience of an on-line wagering system for both users and managers.

It is a further object of the invention to facilitate collection of marketing information in an on-line wagering system.

It is still another object of the invention to employ a user-carried processor interactive with a wagering system processor to divide responsibility for duties including data selection, validation and storage, in a manner that improves accuracy, security and convenience while making marketing data more accessible for analysis.

It is yet another object of the invention to optimally divide data storage needs of an on-line wagering system between a centralized system memory and decentralized memory located on individual user cards employed to enter play data.

These and other objects are accomplished by an on-line wagering system with programmable player entry cards including cards having on-card data storage for value tokens and data uniquely related to a player to whom the card is issued. The player cards are operable in cooperation with the central system processor as play validation and play entry means in lieu of mark sense slips, keyboard entry and printed validation receipts. Demographic player data uniquely related to the player is stored on the card and/or in the central system data memory and allows correlation of play entries with player demographics. A plurality of agent terminals in data communication with the central data processor interface between the central processor and the player cards. The agent terminals preferably also accept traditional mark sense entry slips and produce printed verification receipts, upon request.

BRIEF DESCRIPTION OF THE DRAWINGS

There are shown in the drawings certain embodiments that are presently preferred. It should be understood, however, that the invention is not limited to the precise arrangements and instrumentalities shown. In the drawings.

DETAILED DESCRIPTION OF THE PREFERRED EMBODIMENTS

Figure 1:
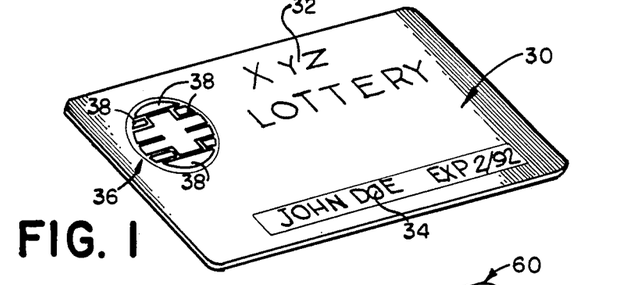
FIG. 1 is a perspective view of a smart card for use in the system according to the invention.

FIG. 1 illustrates a player card 30 in the form of a "smart card" having an on-card data storage means. Information to be stored regarding a player, the player's entries (both historical and prospective), player payments and the like can be stored wholly or partly on the player's card 30 and in a central wagering system data memory. The card 30, issued to an individual player whose name 34 can be printed directly on the card 30, carries an on-board memory and preferably includes a microprocessor accessing the memory and conducting programmed data communication with external devices. A connector area 36 has a plurality of exposed conductive contacts 38, by which the external devices access the processor, and the information stored on card 30.

Card 30, although equipped with a memory and preferably a microprocessor controlling access thereto, has minimal supporting electronics. DC power, processor clock signals and preferably a programming power supply, are all supplied by connections to external devices, e.g., the system agent terminals. Therefore, the card itself need not include a crystal oscillator, storage battery or other means which might have a limited life or be difficult or expensive to house in a thin plastic card.

Figure 2:
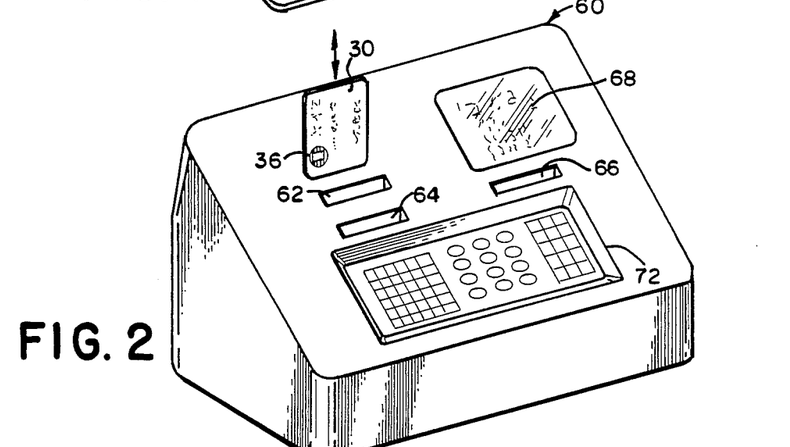
FIG. 2 is a perspective view illustrating loading of a smart card according to the invention into an agent terminal.

Card 30 is adapted to interface with a reading device provided in agent terminal 60, as shown in FIG. 2. In many respects, agent terminal 60 is similar in structure to conventional agent terminals, but also accommodates smart cards. A keyboard 72 is provided for manual data entry. A CRT or similar display 68 provides visual feedback to the agent. Reader mechanism 64 is adapted to receive hand-marked entry slips from users. Printer 66 is provided for producing printed validated receipts. According to the invention, however, data entry functions formerly accomplished by mark sense reader 64 and verification functions formerly accomplished by printer 66 are accomplished by direct data communication with card 30. Card 30 also enables additional conveniences and functions that have been unavailable in conventional systems.

Agent terminals 60 includes a connector adapted to interface with conductive pads 38 on players' cards 36. When a card 30 is detected in interface device 62, clamping means engage the card to ensure good electrical connection between connector 36 and the power and signal conductors of the agent terminal. An internal clock signal is supplied by agent terminal 60, as well as a reset signal, supply voltage and ground. The clock and supply voltages for the cards can be the same ones used internally by the processor operating the agent terminal, whereby operations are synchronous. A pulsed programming voltage and an input/output signal line also interface between the agent terminal 60 and the player card 30.

Figure 3:
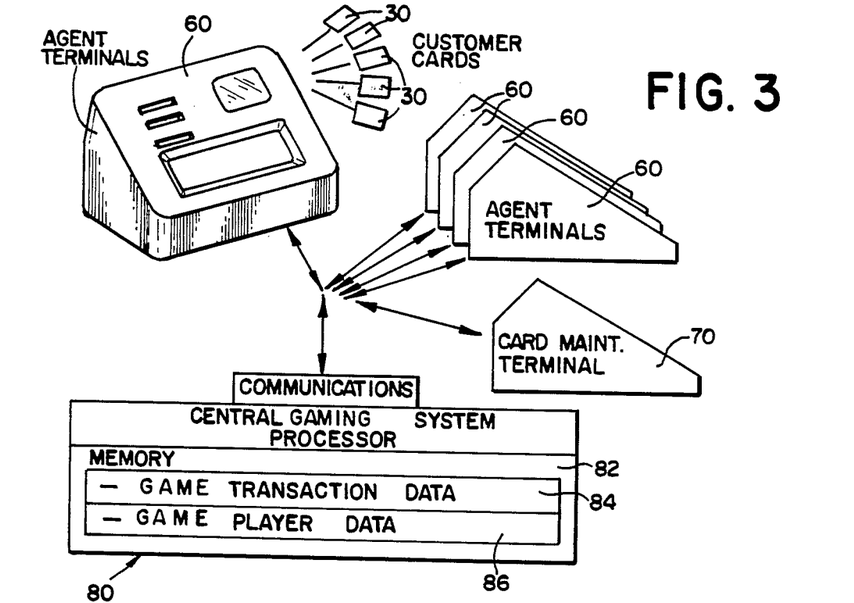
FIG. 3 is a schematic diagram showing the on-line wagering system, including a plurality of agent terminals in data communication with a central processor.

The overall configuration of the on-line wagering system according to the invention is shown in FIG. 3. Any of a plurality of customer cards 30 can be loaded into each of the agent terminals 60, to accomplish transfer of data from the cards to the agent terminals and from the agent terminals to a central system processor 80. Likewise, communications from the central system processor can be directed to the agent terminal 60 and then to the customer cards, in order to accomplish functions such as communications, validation of player entries, transfer of identity information and the like. Preferably, communications between agent terminal 60 and central processor 80 are over telephone lines or radio communication links, and can be encrypted as necessary.

The cards 30 can be identical, or can be of certain types having different capabilities. More sophisticated and expensive cards can be provided to players who require more operations, with more sophisticated (and expensive) cards being provided as a promotion to players who store more value tokens for future plays.

Each of the customer cards preferably stores information respecting a sum of consideration paid by the customer to the on-line wagering system, which is reduced by cancellation of incremental tokens wherever the customer enters a play or otherwise purchases a service. For the information of the customer, it is possible to outfit the agent terminal 60 to simply read out the current token value sum stored on a given customer card. The terminal can be programmed upon acceptance of customer payments to reactivate tokens that have been deactivated when presented as payment for plays. Alternatively, a separate card maintenance terminal 70 can be provided at certain locations in order to issue customer cards 30, to add token values, and otherwise to process information. Card maintenance terminal 70 need not be in real time communication with the central on-line wagering system processor. Instead, the card maintenance terminal can produce a tape or other record of transactions, which can be loaded into the central processor periodically.

The central wagering system processor has a certain data memory capacity and each of the customer cards has a certain data memory capacity. According to the invention, data used to identify customers, to identify transactions and in part to manage the operation of the lottery is stored wholly or partly on the customer cards. This not only reduces time and storage demands on the central wagering system and its memory, but also enables new functions not formerly available. There are operational and security implications to storing portions of the information in one area or the other. In one embodiment, as shown in FIG. 3, both wagering transaction data and player data are stored at the central processor. In this case, the customer cards store only unique identifying codes and token values. Preferably, however, the customer cards carry on-card memory for a large part of the data relating to the identity of the customer and the customer's play history. This data preferably includes demographic data, for example the age, gender, home address of the customer and the like. If the system is arranged such that the customer card stores a simple I.D. code, that code is recognized by the central processor and uniquely correlated with player data stored in a memory section 86. Wager transaction data, including for example the numbers played by customers, a sequence number for each transaction and the like, can be stored in the wager transaction data memory 84.

Figure 4:
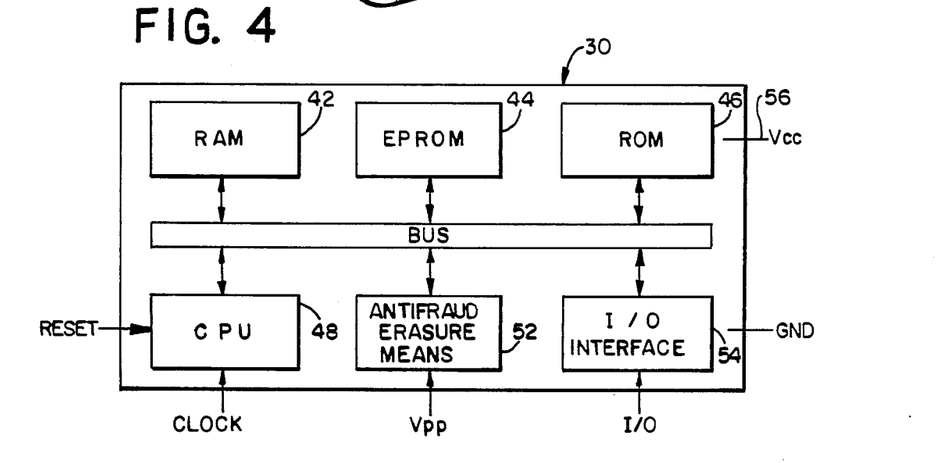
FIG. 4 is a block diagram of on-card components of a smart card according to the invention.

The internal workings of an appropriate smart card, for example as available from Thomson Components-Mostek Corporation, is shown in FIG. 4. Card 30 includes external connections for supply power 56, ground, data input/output via interface 54, a programming voltage routed through a fusible link or the like included in an antifraud means 52, the processor clock and a reset signal. These lines connect across connector 36 via individual conductive pads 38, engaged against the card when the card is loaded into terminal 60. Preferably card 30 includes not only memory, but also has an active microprocessor 48 controlling operations and controlling access to the on-card memory. Processor 48 employs memories 42, 44, 46, which are volatile RAM, electrically programmable nonvolatile EPROM and non-volatile ROM, respectively. RAM 42 stores current working data. The electrically programmable EPROM 44 can be used to store token information, and the operations of processor 48 can be programmed using ROM 46. To provide a re-usable card, memory unit 44 can be electrically programmable and erasable (EEPROM). RAM 42 can be a non-volatile random access memory if desired, for example employing magnetizable cores or bubbles. EPROM 44, which preferably stores token value bits, can be protected by an anti-fraud disabling means 52, which is disposed between the supply of the EPROM 44 and the source of programming voltage $V_{pp}$, for example pulses at about 40 volts used to set addressed bits in EPROM 44. Under control of CPU 48, the anti-fraud disabling means can be made operable to render the card inoperable (or even to erase value tokens) in the event unauthorized access is attempted, for example should a user attempt surreptitiously to increase the number of active tokens on the card. Where antifraud means 52 has a fusible conductor, the conductor can be opened when unauthorized access is attempted (e.g., upon two tries without correct codes), rendering the card unusable. In each case, input/output with card 30 is conducted serially through an input/output interface 54.

Card 30 as shown in FIG. 4 comprises an active processor and memory. The agent terminal 60 and/or card maintenance terminal 70 is used to inquire with CPU 48 on card 30 as to play entry data desired, number of active tokens and the like. CPU 48 is also used to verify that spent tokens have indeed been cancelled when a play is entered. These communications pass through terminals 60 or 70.

Figure 5:
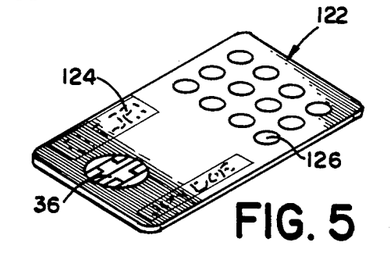
FIG. 5 is a perspective view illustrating a smart card having input and output means.

It is also possible according to FIG. 5 to employ a so-called "super" smart card 122, having on-board means enabling user controlled reading and writing to at least certain parts of the on-card memory. Card 122 includes a memory and processor interfaced to agent terminal 60 through a connector 36 in the same manner as the previous embodiments. However, instead of using only the agent's keyboard 72 on terminal 60 to read, write or access the card memory, the user is also able directly to interface with the card apart from loading the card in the terminal, for certain limited functions. In this event, it is necessary to provide an alternative supply of power, clocking for the microprocessor, input/output and the like. These are provided on the card, or by means of a user-carried housing into which the card is loaded.

CPU control is preferred for user access to the card just as for agent terminal access, but may be inconvenient apart from agent terminal 60 due to the need for power, clocking signals, etc. Apart from CPU 48, gating can be provided allowing user-controlled access to limited portions of the memory using key switches 126 to address and display memory data on outputs such as LCD display 124. Key switches 126 can be parts of a membrane keypad on the surface of the card, or can be arranged as pairs or conductive pads which the user bridges using a tool to operate internal gating on the card. The necessary gating can be arranged in large scale integrated circuits on the card or in a user-carried housing. In other respects, card 122 is similar to the regular smart card in which there is no user-interfaced input/output means.

Figure 6:
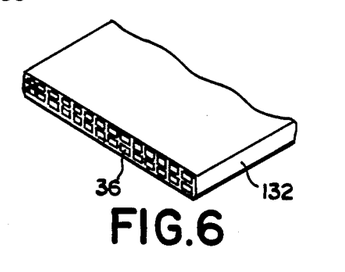
FIG. 6 is a partial perspective view illustrating an alternative connection means between the smart card and the agent terminal.

In addition to the preferred type of electrically conductive connector pad 36, which typically is a metal disc subdivided into six to ten conductors, it is possible to use other forms of connectors. FIG. 6 illustrates an edge type connector in which card 132, shown partially cutaway, is interfaced using pin receptacles 36. When card 132 is plugged into the agent terminal, pins in the agent terminal extend into holes 136 to make the necessary contacts. This form of connector is protected against corrosion caused by contact with perspiration on a user's hands and the like. Various forms of connectors are known for receiving pins, for example spring contacts and the like.

Figure 7:
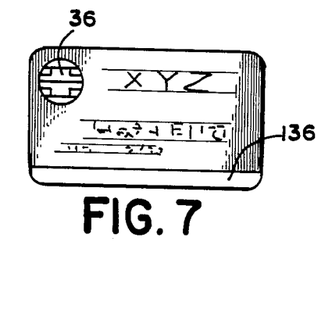
FIG. 7 illustrates a smart card also having a magnetic strip for incidental data storage.

It is also possible to incorporate together with the user card a means for storing information in a less active manner. As shown in FIG. 7, the card can have the usual electrical connector 36 by means of which contacts in the agent terminal can read and write data to and from the card, under supervision of the card's onboard CPU. Moreover, in FIG. 7 an additional magnetic strip 136 is applied along the edge of the card, for storage of an additional code. By use of a known programmed sequence of codes, it is possible to ensure that every time access is made to the card, an internal code is updated according to the program. A complementary code, or the same code can also be writted on the magnetic strip, or the strip can be used for other forms of information such as a user's name.

Figure 8:
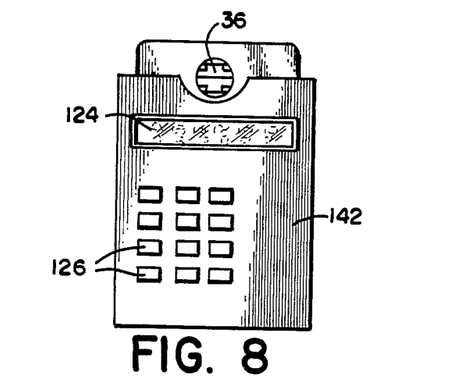
FIG. 8 is a plan view of a combined smart card and housing means including input/output hardware.

The embodiment of FIG. 8 is similar to the embodiment of FIG. 5 in that the user can interact with the card apart from agent terminal 60. A housing member 142 receives a card, and includes a display 124 and keypad 126 for user access to information stored thereon. FIG. 8 shows the card partially inserted, and when fully inserted, connector 36 is engaged by contacts (not shown) in housing 142. A separate connector, for example that of FIG. 6, can be included alternatively for interface with the housing 142, whereby the usual connector 36 is employed only when the card is entered in the agent terminal for reading or writing and the alternative connector engages housing 142.

Figure 9:
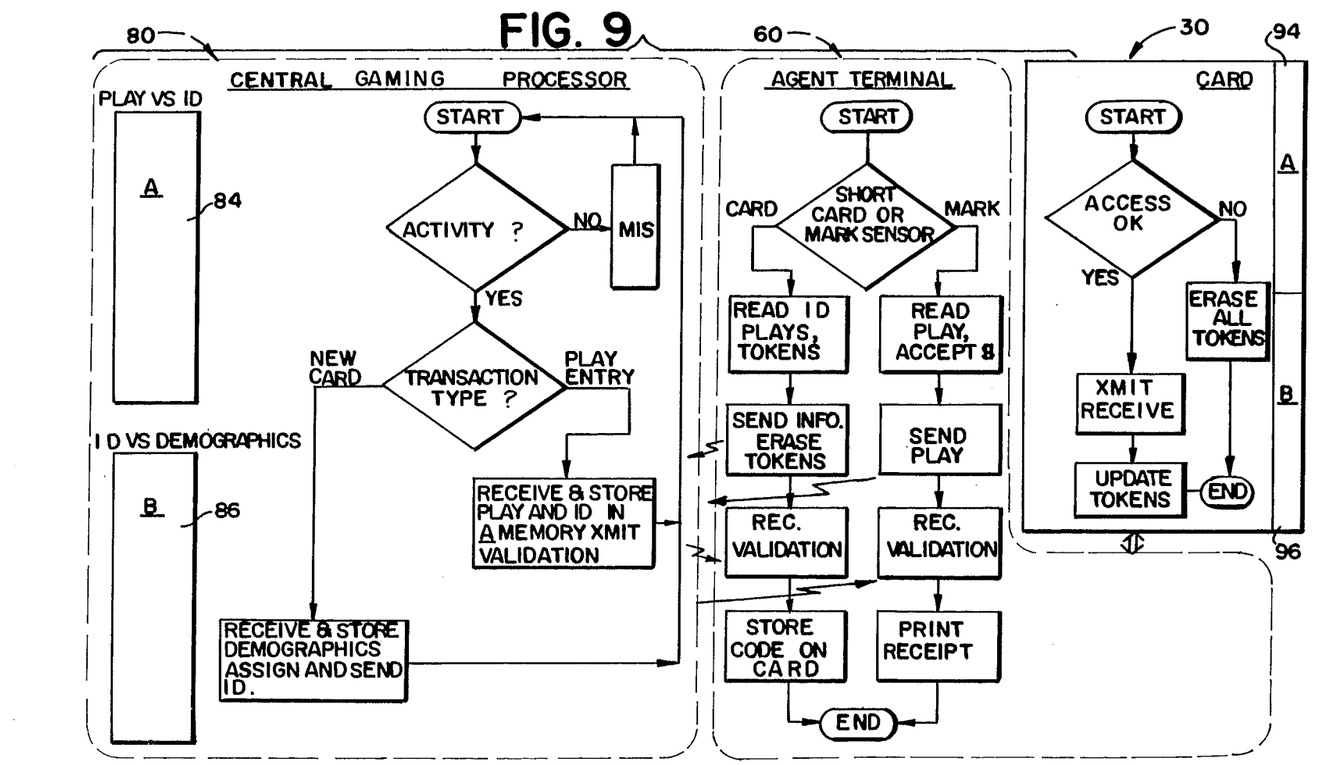
FIG. 9 is a block diagram illustrating certain aspects of system operation according to the invention.

FIG. 9 shows an embodiment of the invention in which play entry data is stored in memory A, designated by reference numerals 84, 94. A second memory B, designated by reference numerals 86, 96 stores user-specific data. As shown in FIG. 9, memories A and B distribute data storage between the central lottery processor 80 and the user's card 30. The B memory demographic data in processor 80 preferably is a record of demographic data of current players, downloaded from cards 30 to a separate storage area for analysis apart from central on-line wagering operations. Demographic data analysis using memory 86 is made available by virtue of storage of this information in connection with issue of card 30 to a given user. User's can be uniquely tracked and/or the response of groups of users to wagering system marketing efforts can be monitored without a great deal of additional data input. Moreover, there is no need for the central wagering system to maintain a database with demographic information regarding the millions of users who might wish to play. This is a substantial benefit to operators of wagering systems, and allows a management information system to be employed to monitor the successive promotions, performance of advertising media and the like, without undue data processing cost and complexity.

In many respects, the embodiment of FIG. 9 is similar to an on-line wagering system in which users are required to hand-mark written play entry slips, which are then read by the agent terminal and the data transmitted to the central processor, which returns a validation code and causes the agent terminal to print a validation receipt. Preferably, all the same activities are undertaken in the system according to the invention as in previous systems. Not all users may play regularly enough to want their own user card or to be willing to pay for one if they are sold to users. In the event a user card is employed, the user card will be issued together with a record of the player's demographic data, preferably substantially all stored on the card, which data is available when the card is accessed by an agent terminal.

User identity and demographic analysis is preferably undertaken by management of the on-line wagering system. Analysis also can proceed, if desired, at the level of the local agent, i.e., the business operating terminal 60, whereby the agent can monitor his own customers if desired. In the event demographic data is stored wholly on the card, or alternatively if the agent terminal is allowed to access demographic data in the central system by transmitting a unique user identity code to the central lottery processor, then the agent as well as the managers of the wagering system can determine various points of information about the customers. For example, birth dates, addresses and the like are important marketing tools for wagering system managers. These same tools may assist agents, that typically operate separate businesses (e.g., news shops, liquor stores, etc.) in which the agent terminals are located. The availability of information allows the wagering system managers (and possibly agents) to provide promotions and incentives, for example premium products and/or free plays on a player's birthday, discounts to frequent customers and the like, which otherwise would not be available without entering data on the identity of the user with every play or other access to card 30.

In many on-line wagering system jurisdictions, particularly in Europe, all users are required to write their complete names and addresses on every play entry. For example, should a player have a set pattern of numbers played frequently in a lottery game, or a pattern of games or contestants selected in any type of wager entry as a matter of habit, it would be quite tedious also to enter the player's name and address for every play. Th card of the invention, due to its unique association with the user and on-card storage of the user's identity and address, this function can be conducted entirely electronically.

FIG. 9 includes flow charts demonstrating the parallel operation of the central on-line wagering system and distributed agent terminals for smart cards 30 and written mark sense slips (not shown). The processor on the card is simply programmed to determine whether it is being legally accessed, for example by comparing an encryption code received to an encryption code stored in a table in the card's memory. If unauthorized access is attempted, for example more than once, the card disables further access and becomes inoperative. In the event access appears to be legal, the card determines whether it is being inquired to transmit data or to receive instructions, whereupon the card conducts its internal memory read out or update. The number of active tokens is then corrected, for example by cancelling a token in the event of a play, which fact is verified by reading out the token values, whereupon activity on the card is suspended. Should the card be used to read out information, for example the habitual playing numbers or playing patterns of a user, the card can be programmed to operate in a loop, reading out one play at a time until either the list of plays or the sum of tokens is exhausted.

Agent terminal 60 can be operable, for example, by initially determining whether a mark sense card or a smart card has been loaded. Should a mark sense card be loaded, the agent terminal operates conventionally by reading the data, recording the customer's payment, communicating on-line with the central wagering system 80 and receiving a validation code, whereupon a receipt is printed. In the event the agent terminal detects that smart card has been loaded in the port, the agent terminal reads the I.D., which can be as little as a unique sequence number or as much as the user's complete demographic information. The agent terminal also reads whether the card is requesting plays according to specific numbers or patterns, and the number of tokens present. Should plays be requested, these are initiated in the same manner as if initiated by a mark sense card. Specifically, communications are undertaken with the central processor 80 to enter the play in the pool of players, for possible win. Payment is verified as the number of tokens is corrected. A validation code is then sent to the agent terminal. The agent terminal processor and/or the central lottery processor at this point have an opportunity to read demographic data from the card. A unique player-identifying indicia stored on the card can also be used as a means to look up demographics or to double check a list of active players determined by means of system-stored encryption codes which will be accepted by the card as indicating legal authorized access.

Statistical studies of the demographics of players are possible without accessing demographic data for every player. A sampling of demographic data is likewise sufficient for many such studies, within certain confidence levels determined by the number sampled. Where less complete data will suffice or where a long term study is desired, demographic data can be taken from randomly selected entrants or from every one of so many sequential entrants, etc. Similarly, management may wish to conduct studies limited to certain areas, certain groups of more-successful or less-successful agents, etc., which can be accomplished by reading demographics from selected players only. The microprocessor-controlled access to card-stored data facilitates studies of this type.

According to the invention, validation codes as well as play histories for a given card are stored back on the card 30. This play history record is a form of demographic data in itself, and is another means by which the wagering system and/or its agent terminals could be programmed for analyzing play patterns. The system preferably also is arranged to reward frequent users or to positively reinforce playing on some regular or irregular schedule.

The validation code being available on the card, the user is free of any need to keep track of printed verification receipts from a plurality of plays, all this information accurately being stored on card 30. Stored play entry patterns similarly avoid need for written entry slips and also improve accuracy. Inasmuch as play pattern data and play history data are both stored on the card, it is possible for the user to proceed without writing down anything, even the play entry numbers which have been submitted in previous plays. Agent terminals, upon reading the play history of a card and the verification codes thereupon, can be programmed to read old plays to determine whether a card has an unpaid winning play. The terminal can then automatically increment the number of active tokens to pay a win. Preferably, in the event of a win, a winning user's card when entered in the agent terminal activates visible and audible promotional outputs, providing reinforcement for play and a reminder to all players of the possible rewards.

At a minimum, a smart card is preferably adapted to store and read out unique indicia representing a user and the user's play data, for example including at least a serial number or other specific data unique to the user, and the time of play, date, security code (assigned by the central processor) and amount of wager. The card preferably has on-card storage of the authorized user's name, address and demographic description or is coded to access uniquely this information.

Published protocols exist for storage and data communication using accounting cards. The International Standards Organization (ISO) publishes such a protocol for smart cards used in connection with banking, credit and the like. These protocols are preferably employed where possible such that general purpose smart cards can be acquired by users for on-line wagering use.

The system of the invention is of substantial benefit to the user in terms of convenience and accuracy of transcription of play data. The invention smoothes the process of entering a play and also recording a win. In fact, the user's name and address being traceable using data available to the central system, the prize for the winner can even be mailed to the address of record of the winning party. The invention also benefits the wagering system operator. By uniquely identifying players, a reward can be assured to the correct player. Inasmuch as cards are issued only to authorized users, it is not readily possible for stolen cards to benefit the thief, or for prizes to be misdirected. The card also facilitates management information reporting such as which group of players is most apt to play which available game, etc. Security is improved due to the possibility of encryption of data moving between the card, agent terminal and wagering system computer under programmed control.

A unique number can be used to identify individual persons, and the number then used to provide access to user information stored in a central wagering system memory. Many players prefer to be identified by their name and address rather than by a dehumanizing sequence number. The use of a social security number, for example, may cause players to become suspicious of monitoring by credit companies, creditors and the like. The present invention retains the human identity features of previous on-line wagering by facilitating demographic analysis and name/address identification.

Where a central file is maintained in the central wagering system containing demographic and identity data on the millions of players who may play a lottery in a given day, the overhead for data storage could be prohibitive. According to the embodiment of the invention in which user information (name, address, demographics, security code and play information of choice) is stored directly on the card, data storage and data processing requirements are optimally shared between the card and the central computer, but needed data remains accessible with every wager.

The storage of information directly on the cards permits even agents to access this data directly without necessarily accessing a data file in the central terminal. This reduces the extent of data transmission over the phone lines or radio links that may be exposed to possible eavesdropping. Communications need not become congested with extensive data respecting a large number of players.

Wagering system agents sometimes keep a card file of regular plays undertaken by their customers. This function is also readily possible by storing a list of chosen plays on the individual user's card. The user chooses regular plays or enters new play data as desired. Similarly, the agent terminals can change the chosen play data at the user's request, storing a new pattern back on the card.

A security code is preferably required for access to at least part of the card stored data. The security code needed to access a customer card can be encrypted according to a plurality of keys, changeable keys, etc. For example, a legally authorized access may include transmission of a manufacturer's assigned code, the unique code associated with the card and a unique code assigned by the issuer. In this manner, neither the user, the issuer nor the card manufacturer can necessarily access the cards and a breach of security at any of these levels will not defeat system security. Nevertheless, the card is preferably programmed such that if two or more consecutive attempts are made to access the information using improper codes, the fusible link is burned out to "lock" the card by preventing passage of the programming voltage pulse needed to "spend" stored tokens. A fusible link can also be provided as a means to break connection of data lines through the input/output interface or the like.

The particular interface equipment required to read or write data to the card is of a standard format. RS232 or RS422 serial transmissions are preferred. Direct contact is preferably made between the agent terminal and the conductive contacts on connector 36 when the card is installed in the input port of the agent terminal. It is also possible to supply power and to communicate using other means than direct connection such as power radiation coils and modulated signal coils placed nearby corresponding coils on the card, the card and the agent terminal being electromagnetically coupled together.

The invention having been disclosed, a number of additional variations will now become apparent to persons skilled in the art. Reference should be made to the appended claims rather than the foregoing specification as indicating the true scope of the invention.

What is claimed is:

1. An on-line wagering system, comprising:
a central data processor having a central data memory;
a plurality of agent terminals in data communication with the central data processor, the agent terminals being operable to receive player entry data from players and to transmit the player entry data to the central data processor, the central data processor being operable to validate play entries upon receipt of the player entry data and to transmit a validation code to the agent terminals, the player entry data relating to an entry of an individual player in at least one game, the agent terminals having inputs for receiving the player entry data and input/output means for transmitting to the central data processor at least a portion of the player entry data and for receiving the validation data therefrom; and,
a player card issued to the player, the player card being connectable in data communication with at least one of the agent terminals, said at least one of the agent terminals having alternate inputs for receiving at least a portion of the player entry data directly from the card, the alternate inputs being adapted to interface with the player card, the player card having an on-card memory operable to store data unique to said individual player and also to store at least one of the player entry data and the validation code.

2. The on-line wagering system of claim 1, further comprising programmable means on the player card for representing incremental value tokens, the tokens being decremented upon entry of the individual player in the at least one game.

3. The on-line wagering system of claim 1, further comprising security means on the player card preventing unauthorized alteration of data stored on the card, the security means detecting unauthorized attempted access to data on the player card and the player card further comprising indicia settable by the security means to render the player card inoperable.

4. The on-line wagering system of claim 1, wherein at least one of the on-board memory of the player card and the central memory of the central data processor are operable to store a history of play entries of the particular player and a plurality of validation codes received from the central processor, and further comprising means operable to read the validation data for verification of wins.

5. The on-line wagering system of claim 4, wherein the player card includes a unique indicia representing a player to whom the card is issued.

6. The on-line wagering system of claim 3, wherein the player card has stored means representing an account balance and the security means is operable to detect attempted unauthorized changing of the balance, the card having a fusible link spendable by the security means.

7. The on-line wagering system of claim 3, wherein the central data processor includes a player data memory for storage of at least some of said data unique to said one of the players, said data unique to said one of the players being read from the player card by the agent terminal and transmitted to the central data processor by the agent terminal, whereby patterns of plays of individual players can be analyzed at the central data processor.

8. The on-line wagering system of claim 7, wherein at least one of the player data memory of the central data processor and the on-board memory of the player card store demographic data relating to the individual player.

9. The on-line wagering system of claim 8, wherein the demographic data and the play history data are accessible for transmission from the player card to the central data processor upon each play of said individual player.

10. The on-line wagering system of claim 8, wherein the demographic data and the play history data are read from the player card by the agent terminal and transmitted to the central data processor upon at least one of initiation of a play, addition of incremental value to the player card and retirement of the player card.

11. The on-line wagering system of claim 8, wherein the demographic data is stored at the central data processor and only the data unique to the individual player is read from the player card by the agent terminal and transmitted to the central data processor.

12. An on-line wagering system, comprising:
a plurality of agent terminals operable to accept data relating to play entries in a game, the agent terminals having keyboard input means for accepting the data and a printer operable to produce a printed receipt confirming initiation of a play in the game, at least some of the agent terminals further comprising means for receiving player cards;
at least one central data processor in data communication with the agent terminals, the data processor receiving at least a part of the data relating to a given play entry from a given agent terminal and transmitting to said agent terminal a code indicating that the data relating to the play entry has been validated; and,
said player cards being uniquely issued to players of the game, the player cards each having on-card data storage, the on-card data storage containing data unique to an individual player stored upon issue of the card to the player, said data unique to the player being transmitted from the agent terminal to the data processor.

13. The on-line wagering system of claim 12, wherein the player card further comprises programmable means representing value tokens activated upon receipt of payment from a player and deactivated during initiation of play entries.

14. The on-line wagering system of claim 12, wherein at least some of the player cards comprise programmed microprocessor-controlled memory means including a processor, alterable memory for storage of data and inalterable memory for programming.

15. The on-line wagering system of claim 14, wherein the player card comprises electrically programmable read only memory (EPROM) for storage of at least one of player identify data, player demographic data and player standard choices, in each case relating to a player to whom the card is issued.

16. The on-line wagering system of claim 14, wherein said alterable memory includes electrically programmable and erasable read only memory (EEPROM) operative for storing value tokens activated upon acceptance of payment from a player and deactivated during initiation of play entries.

17. The on-line wagering system of claim 15, wherein said player demographic data includes at least one of name, address, age and gender.

18. The on-line wagering system of claim 15, wherein the standard play choices include at least one of player number choices in a random number lottery game and patterns of player entries for a plurality of lottery games.

19. The on-line wagering system of claim 14, wherein the player card further comprises means for accepting manual input from the player and means for displaying selected data.

20. The on-line wagering system of claim 15, further comprising manual input means and visual display means on the player card, said input and display means being operable by the player to display the activation status of said value tokens and to allow the player to select play entries and play entry patterns.

21. The on-line wagering system of claim 20, wherein the input and display means includes a user-carried housing for receiving the player card, said input and display means being located in the user-carried housing.

* * * * *